United States Patent [19]
Carrico et al.

[11] Patent Number: 5,359,487
[45] Date of Patent: Oct. 25, 1994

[54] CAPACITOR ASSEMBLY OF THE WOUND-FOIL TYPE

[75] Inventors: Philip H. Carrico, Greenfield Center; Roger W. Holmes, Queensbury, both of N.Y.

[73] Assignee: General Electric Company, Schnectady, N.Y.

[21] Appl. No.: 9,479

[22] Filed: Jan. 27, 1993

[51] Int. Cl.$^5$ ............................................. H01G 4/00
[52] U.S. Cl. ................................ 361/301.5; 361/303; 361/313; 361/324
[58] Field of Search ...................... 361/301.5, 303, 313, 361/324–328

[56] References Cited

U.S. PATENT DOCUMENTS

| | | |
|---|---|---|
| 2,638,494 | 5/1953 | Liecuti . |
| 3,090,895 | 5/1963 | Hall . |
| 3,390,312 | 6/1968 | England . |
| 4,228,481 | 10/1980 | DiNicola et al. ............ 361/314 |
| 4,344,105 | 8/1982 | Holtzman et al. ............ 361/328 |
| 4,348,712 | 9/1982 | Newcomb ............ 361/315 |
| 4,467,397 | 8/1984 | Thiel et al. ............ 361/328 |
| 5,041,942 | 8/1991 | Carrico ............ 361/330 |

Primary Examiner—Marvin M. Lateef
Attorney, Agent, or Firm—William Freedman

[57] ABSTRACT

This capacitor assembly includes inner and outer sheets of metal foil constituting first and second electrodes, respectively, of the assembly and dielectric film interposed between the foil sheets and insulating the foil sheets from each other when the capacitor assembly is energized. The foil sheets and the dielectric film are wound about a central axis to form a roll in which the sheets and the film are disposed in interleaving turns extending about the central axis in face-to-face relationship. Each of the foil sheets has a head edge near the central axis and a tail edge near the outer periphery of the roll. The head and tail edges of the inner foil sheet are folded over to reduce electric-field stress concentrations adjacent these edges. But the head and tail edges of the outer foil sheet are left unfolded, and the outer foil sheet adjacent its head and tail edges extends about the central axis substantially beyond the respective head and tail folded edges of the inner foil sheet. As between the above two foil sheets, the foil sheet nearer to the outer periphery of the roll is considered to be the outer foil sheet.

9 Claims, 3 Drawing Sheets

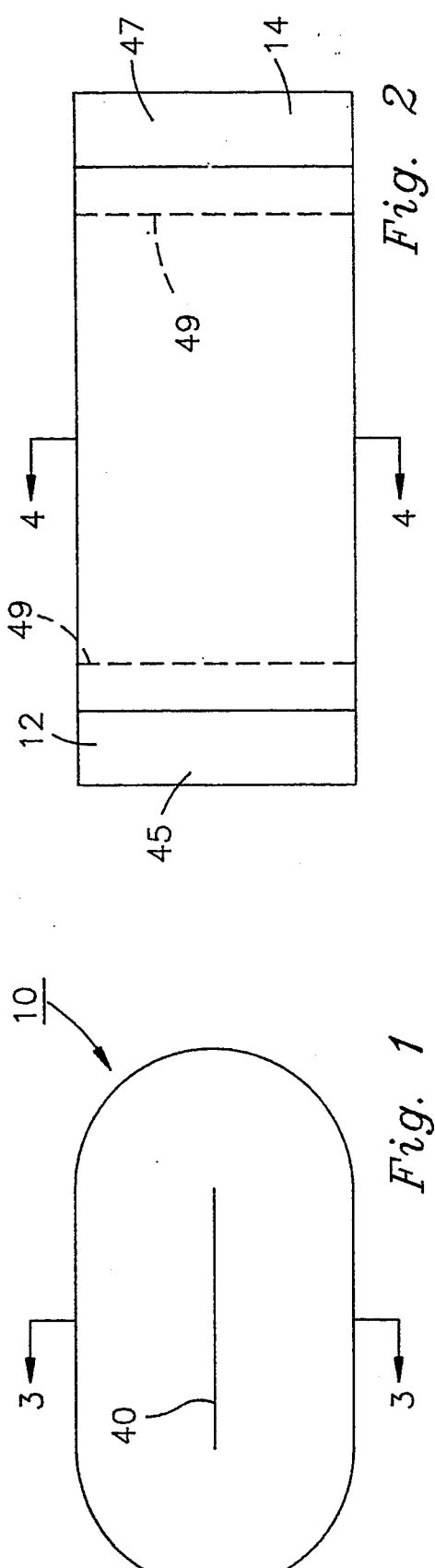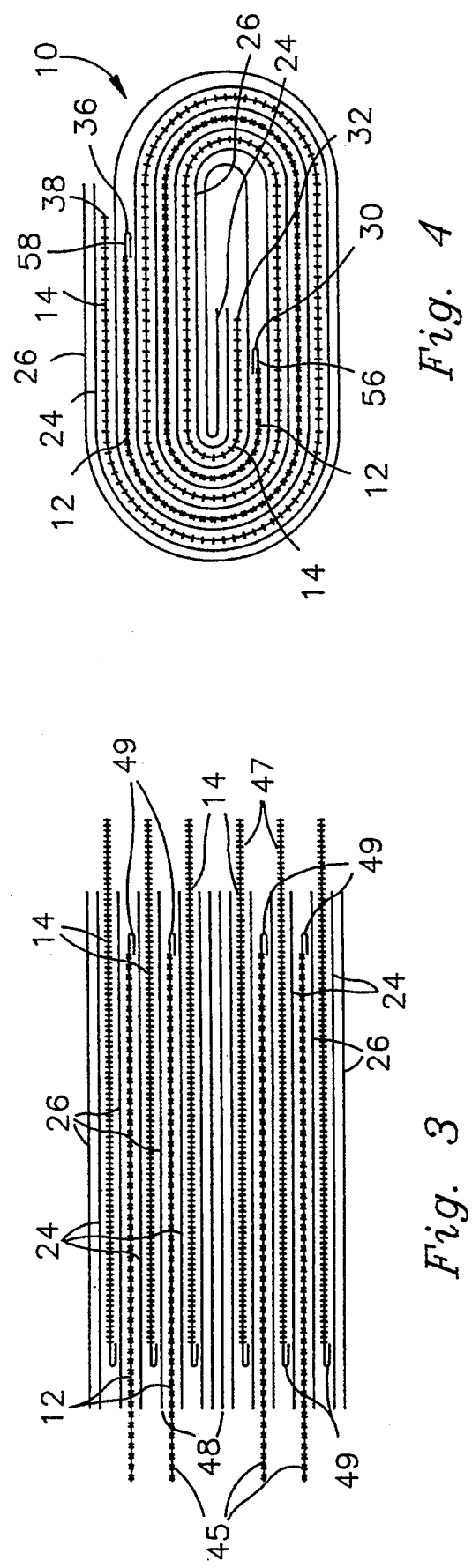

CAPACITOR ASSEMBLY OF THE WOUND-FOIL TYPE

TECHNICAL FIELD

This invention relates to a power capacitor assembly that comprises two sheets of metal foil acting as electrodes of the capacitor assembly and film of dielectric sheet material interposed between the foil sheets and providing electrical insulation therebetween when the capacitor is energized.

BACKGROUND

In this capacitor assembly the foil sheets and the dielectric film are wound about a central longitudinal axis to form a roll in which the sheets and film are disposed in interleaving turns extending about the axis. Each of the foil sheets has two side edges disposed at opposite ends of the roll, a head edge near the central axis of the roll, and a tail edge near the outer periphery of the roll.

A widely-used design for this type of capacitor roll is the extended-foil design. In this design, one of the foils has one of its two side edge regions extending out beyond the dielectric film at one end of the capacitor roll, and the other of the foils has one of its two side edge regions extending out beyond the dielectric film at the other end of the capacitor roll. The other side edge region of each foil is located in a position spaced inwardly from the adjacent outer edge of the dielectric film, or, in other words, in buried relationship between the turns of the dielectric film.

For reducing electric-field stress concentrations at the edges of the sheets, it is conventional to fold over all edges of the sheets that are disposed in buried relationship between the turns of the dielectric film. In an extended-foil type of capacitor, this has involved folding over one side edge of each foil sheet and the head and the tail edges of each foil sheet. The apparatus for folding over these edges is relatively expensive. It typically comprises a folding device for each side edge of the foil sheet that is to be folded and another folding device for the head and tail edges of each foil sheet.

OBJECT

An object of our invention is to provide a power capacitor assembly of the type referred to hereinabove in the first paragraph under "Background" that is of such a design that it provides the required inter-electrode dielectric strength and capacitance without requiring for its manufacture a folding device for the head and tail edges of one of the foil sheets.

SUMMARY

In carrying out our invention in one form, we provide a capacitor assembly comprising an inner sheet of metal foil constituting a first electrode of the capacitor assembly, an outer sheet of metal foil constituting a second electrode of the capacitor assembly, and dielectric film interposed between said inner and outer sheets of metal foil and insulating the foil sheets from each other when the capacitor assembly is energized. The capacitor assembly is further characterized by: (i) the sheets and the dielectric film being wound about a central axis to form a roll in which the sheets and film are disposed in interleaving turns extending about said axis in face-to-face relationship, (ii) the roll having a flattened configuration when viewed in transverse cross-section from a plane perpendicular to said central axis, and (iii) each of the foil sheets having a head edge near said central axis and a tail edge near the outer periphery of the roll. The head and tail edges of the inner foil sheet are folded over to reduce electric-field stress concentrations thereadjacent. But the head and tail edges of the outer foil sheet are left unfolded, and the portions of the outer foil sheet adjacent its head and tail edges are extended about said axis substantially beyond the respective head and tail folded edges of the inner foil sheet. Each of these extended portions of the outer foil sheet is located immediately adjacent a turn of said outer foil sheet so that said latter turn shields said extended portion from the voltage between the two foil sheets when the capacitor assembly is energized.

BRIEF DESCRIPTION OF FIGURES

For a better understanding of the invention, reference may be had to the following detailed description taken in connection with the accompanying drawings, wherein:

FIG. 1 is an end view of a capacitor roll of the wound-foil type referred to hereinabove.

FIG. 2 is a plan view of the capacitor roll of FIG. 1.

FIG. 3 is a schematic sectional view taken along the line 3—3 of FIG. 1. For clarity and simplicity, FIG. 3 shows the sheets and the dielectric film forming the capacitor roll in separated relationship and in single line form. To help distinguish the two foil sheets from each other, the outer foil sheet is marked with spaced-apart short lines extending perpendicular to the path of the foil sheet, and the inner foil sheet is marked with spaced-apart x's.

FIG. 4 is a schematic sectional view taken along the line 4—4 of FIG. 2. For clarity and simplicity, FIG. 4 shows the foil sheets and the dielectric film of the capacitor roll in separated relationship and in single line form. The individual foil sheets are marked in the same manner as in FIG. 3.

DETAILED DESCRIPTION OF EMBODIMENT

Figure 5:
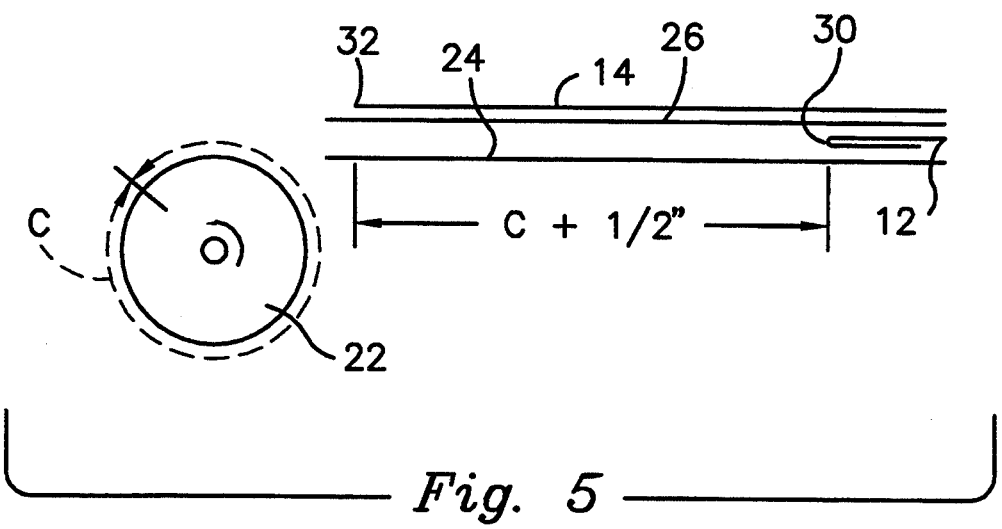
FIG. 5 is a schematic showing of apparatus and a method for making the capacitor roll of FIGS. 1-4, depicted just before a winding operation is initiated.

The capacitor roll 10 shown in FIGS. 1-4 is a component of a power capacitor of the general type illustrated in U.S. Pat. No. 5,041,942—Carrico, assigned to the assignee of the present invention and incorporated by reference herein. In such a power capacitor, a plurality of such rolls are disposed in stacked relationship within a tank filled with dielectric fluid, as shown in the Carrico patent. The dielectric fluid acts as an impregnant of the solid insulation within the stack of capacitor rolls. The capacitor rolls are electrically interconnected in a suitable manner, as for example, by the connecting means shown in the Carrico patent.

Referring now to FIGS. 1 and 4, the capacitor roll 10 shown therein comprises two elongated sheets of metal foil, one being an inner sheet 12 and the other being an outer sheet 14. These foil sheets 12 and 14 serve, respectively, as the two electrodes of the capacitor roll and between these two electrodes a relatively high voltage is applied when the capacitor roll is energized.

In referring in this application to one of the foil sheets (14) as being the outer foil sheet and the other (12) as being the inner foil sheet, we are basing this terminology on the relative positions of the foil sheets in the region adjacent to the outer periphery of the roll 10. As seen in FIG. 4, sheet 14 is closer to the outer periphery of the roll than sheet 12. While the foil sheet 14 in the region adjacent the inner periphery of the roll may be closer to the inner periphery than the other foil sheet 12, for consistency, we still refer to foil sheet 14 as the outer foil sheet.

Between the foil sheets 12 and 14 are thin sheets 24 and 26 of dielectric material that keep the foil sheets spaced from each other and serve to provide electrical insulation between the foil sheets. These sheets of dielectric material are sometimes collectively referred to herein as dielectric film. In the illustrated embodiment each dielectric sheet is of single layer thickness, but it can be of multiple layer thickness, as, for example, when required to withstand higher voltages.

The capacitor roll 10 is made by winding its illustrated components about an arbor 22 (FIG. 5) having a cylindrical outer periphery. In one method of making the roll 10, as indicated schematically in FIG. 5, at the start of the winding operation, the two sheets 24 and 26 of dielectric film and the outer foil sheet 14, in that order proceeding radially outward and in contiguous relationship, are located immediately adjacent the arbor. The inner foil sheet 12 is positioned between the two dielectric sheets 24 and 26, but its head end 30 is positioned to trail the head end 32 of the outer foil sheet 14 by an amount equal to the circumference C of the arbor 22 plus about ½ inch. The outer foil sheet 14 and the dielectric sheets 24 and 26 are suitably held against the arbor periphery. Thereafter, the arbor is rotated counter-clockwise through one full revolution plus about ½ inch as measured at its outer periphery. At this point the head end of the inner foil sheet 12, which is sandwiched between the two dielectric sheets 24 and 26, passes onto the periphery of the arbor and, thereafter, the two foil sheets and the dielectric sheets are wound together about the arbor periphery as the arbor is further rotated counter-clockwise. Arbor rotation continues, building up the desired number of turns of foil and dielectric sheet, until finally the tail end 36 of the inner foil 12 has been applied. Rotation of the arbor 22 is continued for a small fraction of a revolution more, carrying the tail end 38 of the outer foil 14 about the central axis about one half inch beyond the location of the tail end 36 of the inner foil 12. Thereafter, rotation of the arbor is continued for another one and a fraction revolutions, thereby wrapping the two dielectric sheets about the outer periphery of the outer foil. Rotation of the arbor 22 is then stopped, and the dielectric sheets are cut and their ends are taped to the outer periphery of the roll 10.

Figure 7:
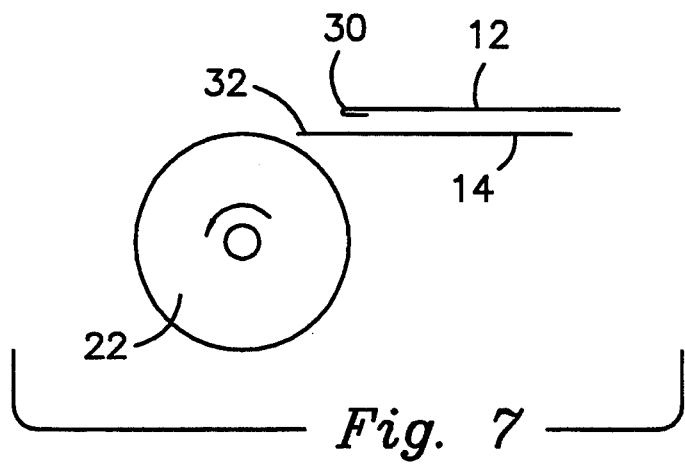
FIG. 7 is a schematic illustration of another method for making the capacitor roll, employing apparatus similar to that of FIG. 5.
Figure 8:
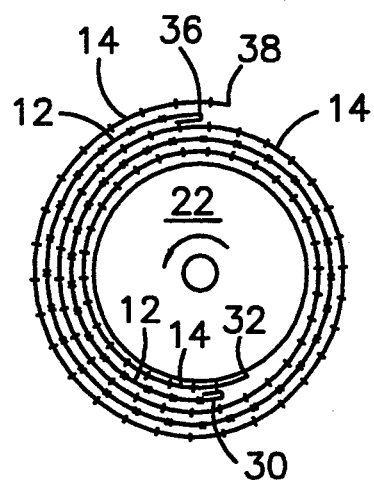
FIG. 8 is a schematic showing of a partially-completed capacitor roll made by the apparatus and method of FIG. 7.

Another method of making the roll 10 is schematically illustrated in FIGS. 7 and 8, where the dielectric film has been omitted from the illustration to simplify these figures. At the start of the foil winding operation, as shown in FIG. 7, the head ends 30 and 32 of the two foils 12 and 14 are positioned with the head end 30 of foil 12 trailing the head end 32 of foil 14 by about ½ inch. With the foils having their head ends angularly offset in this manner relative to each other, the head end of foil 14 is suitably held against the arbor 22 and the arbor is thereafter rotated counter-clockwise until the two foils 12 and 14 have been wrapped together for the desired number of turns about the arbor and the folded tail end 36 of foil 12 has been applied. At this point, the folded tail end 36 of foil 12 is located radially outward of the last-applied portion of foil 14. But rotation of the arbor 22 is thereafter continued for another revolution, and this added rotation is used for wrapping an extra turn of foil 14 about the outer turn of foil 12. Such rotation is thereafter continued for a fraction of a revolution more until the tail end of the foil 14 is applied, locating the tail end of foil 14 about ½ inch beyond the tail end of foil 12, as illustrated in FIG. 8. The arbor 22 is then rotated for another one and a fraction revolutions to wrap the two sheets of dielectric film (not shown in FIGS. 7 and 8) about the outer periphery of foil 14. The net result is a roll essentially identical to the roll formed by the method described in connection with FIG. 5. In both of these rolls, the foil 14, which we refer to as the outer foil, is longer than the other (or inner) foil 12, foil 14 including an extra turn of the roll plus about one inch extra of length so that both of its ends 32 and 38 are located a substantial distance beyond the corresponding ends of the other foil 12. In the method of FIG. 5, the extra turn is located at the inner periphery of the roll, and in the method of FIGS. 7 and 8 the extra turn is located at the outer periphery of the roll.

After a cylindrical roll has been built up by one of these winding operations, the cylindrical roll is removed from the arbor 22 and flattened to produce the flattened roll configuration illustrated in FIGS. 1–4. In FIG. 1 the central horizontal line 40 represents the winding slot where the arbor had been located. The length of the winding slot 40 is equal to one-half the circumference of the round arbor.

The illustrated capacitor roll 10 is a roll of the extended-foil type. As such and as best shown in FIG. 3, at one end of the roll the lateral edge region 45 of the inner foil 12 projects to the left laterally beyond the left-hand lateral edge 48 of the dielectric film 24, 26, and at the other end of the roll the lateral edge region 47 of the outer foil 14 projects to the right laterally beyond the right-hand lateral edge of the dielectric film 24, 26. In the completed capacitor roll (not shown) the exposed left-hand edge regions of foil 12 are suitably joined together, and the exposed right-hand edge regions of foil 14 are suitably joined together. This joining together is preferably effected by the ultrasonic welding process described and claimed in the above-cited U.S. Pat. No. 5,041,942—Carrico. Referring still to FIG. 3, the non-projecting lateral edge region 49 of each foil is located in a recessed position with respect to the adjacent lateral edge of the dielectric sheets 24 and 26. Stated another way, this non-projecting edge region is located in buried relationship between the turns of the dielectric film 24, 26.

The buried lateral edge region 49 of each of the foils is folded over to reduce electric-field stress concentrations adjacent the edge, thereby reducing the chances for a dielectric breakdown in this region. Such folding is now a conventional approach for reducing stresses and the chances for dielectric breakdown at the buried lateral edges.

It is also conventional to fold over the head and tail edges of the two foils in this type of capacitor in order to reduce the electric-field stress concentration in these regions. We use this folded-edge approach on the head and tail edges of our inner foil 12, as is best seen in FIG. 4. The head, or leading, edge of this foil 12 is folded over as shown at 56; and the tail, or trailing, edge of this foil 12 is folded over as shown at 58 in FIG. 4.

It is to be noted, however, that the head and tail edges 32 and 38 of the outer foil 14 are not folded over. As seen in FIG. 4, the outer foil 14 in its head and tail regions extends to its respective head and tail edges in an unfolded condition, i.e., without a fold being present in the foil 14 in either of these regions. We are able to dispense with folding of the outer foil 14 in these regions without impairing the dielectric strength of the capacitor roll because we extend the outer foil a substantial distance about the central axis of the roll beyond the adjacent (and folded) edge of the inner foil, e.g., about ½ inch. As a result of this latter relationship, the regions immediately adjacent the head and tail edges of the outer foil are regions of low electric-field stress. In one embodiment, the unfolded edges of the outer foil are spaced from the adjacent folded edges of the inner foil by about ½ inch (or 500 mils). This is in marked contrast to the 1.2 mil separation between the two foils at the folded head and tail edges of the inner foil, where only a single layer of dielectric sheet separates the two foils. The much greater spacing of the foils that is present at the head and tail edges 32 and 38 of the outer foil greatly reduces the electric stresses at these edges.

Figure 6:
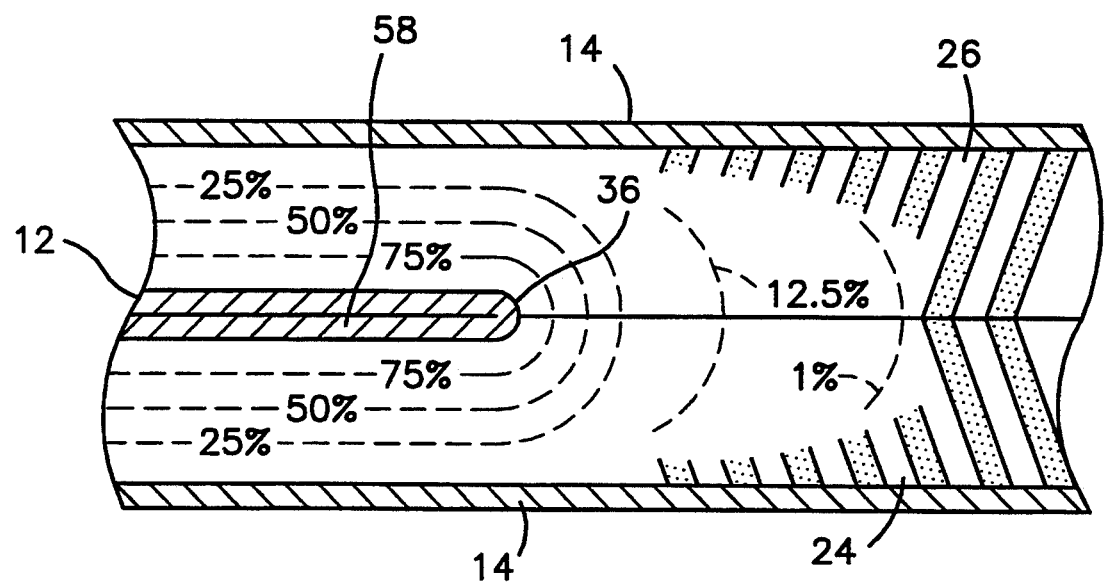
FIG. 6 is a greatly enlarged sectional view taken at the tail end of the inner foil of FIG. 4. The outer turns of the dielectric film are omitted in FIG. 6 for simplicity.

FIG. 6 is provided to more fully explain the point made in the immediately-preceding sentence. FIG. 6 is a greatly enlarged sectional view taken at the tail end 36 of the inner foil 12. This figure is to relative scale, with a scale factor of about 625 to 1. In the actual capacitor, the folded inner foil 12 is 0.0004 inches thick after folding, and each of the dielectric sheets 24 and 26 is 0.0012 inches thick. Since the dielectric constants of the dielectric film material and the liquid impregnant (oil) are very close together (i.e., 2.28 and 2), no refraction is considered. To reach the unfolded end of the outer foil 14 using the same scale would require the outer foil to extend to the right from the tail edge 36 of the inner foil for 300 inches in FIG. 6. Since, as shown in FIG. 6, the electric field falls to less than 1% at 3 inches to the right from the tail edge 36 of the inner foil 12, it will be apparent that the electric field is insignificant, or essentially zero, at 300 inches to the right from this tail edge 36.

A significant advantage of the illustrated capacitor roll construction over one in which the head and tail edges of both foils are folded is that we obviate the need for a folding device for folding over these edges of the outer foil during the manufacturing process. Such a folding device is relatively expensive, and being able to avoid the need for it permits a reduction in manufacturing costs.

Another advantage of the illustrated capacitor roll construction is that the unfolded head-edge construction of the outer foil 14 reduces the chances for wrinkles developing in this region that could reduce inter-electrode dielectric strength.

An important point to note with respect to the low electric-field stress in the two end regions of foil 14 is that each of these end regions, once it extends circumferentially past the folded edge of the other foil, is immediately adjacent only its own foil (14), which is at the same potential as the extended end region. Accordingly, in these end regions there is no voltage present between the extended foil and the immediately adjacent turn of foil. In other words, the immediately adjacent turn of foil 14 shields the extended end of the foil from the electric field between the two foils 12 and 14. For the extended end region of foil 14 to be shielded from the electric field in this manner, it must be the end region positioned nearer the associated periphery of the roll. That is, at the outer periphery of the roll it is the end region nearer the outer periphery of the roll that is so shielded, and at the inner periphery of the roll, it is the end region located nearer the inner periphery that is so shielded. For a single foil to have both of its end regions (i) extending beyond the edges of the other foil and (ii) nearer the associated periphery of the roll, it is necessary for the single foil to include at least one extra turn as compared to the other foil. This is true in both our embodiments since in the roll produced by the method of FIG. 5, there is one extra turn in foil 14 at the inner periphery of the roll; and in the roll produced by the method of FIGS. 7 and 8, there is one extra turn in foil 14 at the outer periphery of the roll.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A capacitor assembly comprising an inner sheet of metal foil constituting one electrode of the capacitor assembly, an outer sheet of metal foil constituting a second electrode of the capacitor assembly, and dielectric film interposed between said inner and outer sheets of metal foil and insulating the foil sheets from each other when the capacitor assembly is energized, said capacitor assembly being further characterized by:
   (a) said foil sheets and said dielectric film being wound about a central axis to form a roll in which said sheets and film are disposed in interleaving turns extending about said axis;
   (b) said roll having a flattened form when viewed in transverse cross-section from a plane perpendicular to said axis;
   (c) each of said foil sheets having a head edge near said central axis and a tail edge near the outer periphery of said roll;
   (d) the head and tail edges of said inner foil sheet being folded over to reduce electric-field stress concentrations thereadjacent;
   (e) the head and tail edges of said outer foil sheet being unfolded, and said outer foil sheet adjacent its head and tail edges extending about said axis substantially beyond the respective head and tail folded edges of the inner foil sheet;
   (f) as between said two foil sheets, the foil sheet closer to the outer periphery of said roll being considered as said outer foil sheet, and
   (g) the outer foil sheet extending about said central axis for at least one extra turn as compared to said inner foil sheet.

2. A capacitor assembly as defined in claim 1 in which the outer foil sheet adjacent its head and tail edges extends beyond the respective head and tail edges of the inner foil sheet by a distance sufficiently great to locate the head and tail edges of the outer foil sheet in regions of essentially zero stress in the electric field present between said inner and outer foil sheets when the capacitor assembly is energized.

3. A capacitor assembly as defined in claim 1 and in which:
   (a) said roll has an inner periphery adjacent said central axis, and
   (b) in the region of said roll adjacent said inner periphery said outer sheet is closer to said inner periphery than said inner sheet.

4. A capacitor assembly as defined in claim 1 and in which:
   (a) each of said foil sheets has two side edges respectively disposed at opposite ends of said roll, and
   (b) one of said side edges of each foil sheet is disposed in buried relationship between the turns of said dielectric film, and the other of said side edges of each foil sheet projects laterally beyond the side edge of said dielectric film, the projecting side edges of the two foil sheets being located at opposite ends of said roll.

5. A capacitor assembly as defined in claim 4 and in which the outer foil sheet adjacent its head and tail edges extends beyond the respective head and tail edges of the inner foil sheet by a distance sufficiently great to locate the head and tail edges of the outer foil sheet in regions of essentially zero stress in the electric field present between said inner and outer foil sheets when the capacitor assembly is energized.

6. A capacitor assembly as defined in claim 4 in which:
   (a) said roll has an inner periphery adjacent said central axis, and
   (b) in the region of said roll adjacent said inner periphery said outer sheet is closer to said inner periphery than said inner sheet.

7. A capacitor assembly comprising an inner sheet of metal foil constituting one electrode of the capacitor assembly, an outer sheet of metal foil constituting a second electrode of the capacitor assembly, and dielectric film interposed between said inner and outer sheets of metal foil and insulating the foil sheets from each other when the capacitor assembly is energized, said capacitor assembly being further characterized by:
   (a) said foil sheets and said dielectric film being wound about a central axis to form a roll in which said sheets and film are disposed in interleaving turns extending about said axis;
   (b) said roll having a flattened form when viewed in transverse cross-section from a plane perpendicular to said axis;
   (c) each of said foil sheets having a head edge near said central axis and a tail edge near the outer periphery of said roll;
   (d) the head and tail edges of said inner foil sheet being folded over to reduce electric-field stress concentrations thereadjacent;
   (e) the head and tail edges of said outer foil sheet being unfolded, and said outer foil sheet adjacent its head and tail edges extending about said axis substantially beyond the respective head and tail folded edges of the inner foil sheet;
   (f) as between said two foil sheets, the foil sheet closer to the outer periphery of said roll being considered as said outer foil sheet, and
   (g) each of the portions of said outer foil sheet that extends about said axis beyond the associated folded edges of the inner foil sheet being located immediately adjacent a turn of said outer foil sheet so that said latter turn shields said extended portion from the voltage between said two foil sheets when the capacitor assembly is energized.

8. A capacitor assembly as defined in claim 7 and in which said outer foil sheet extends about said central axis for at least one extra turn as compared to said inner foil sheet.

9. A capacitor assembly as defined in claim 7 in which each of the portions of said outer foil sheet that extends beyond the associated folded edge of the inner foil sheet extends beyond said folded edge by a distance sufficiently great to locate the head and tail edges of the outer foil sheet in regions of essentially zero stress in the electric field present between said inner and outer foil sheets when the capacitor assembly is energized.

* * * * *